(No Model.)

J. JOHNSON.
RACKING-OFF APPARATUS FOR BEER, &c.

No. 409,973. Patented Aug. 27, 1889.

WITNESSES:
E. B. Bolton
H. M. Morgan

INVENTOR:
John Johnson
By A. P. Thayer,
his Attorney.

UNITED STATES PATENT OFFICE.

JOHN JOHNSON, OF BROOKLYN, NEW YORK.

RACKING-OFF APPARATUS FOR BEER, &c.

SPECIFICATION forming part of Letters Patent No. 409,973, dated August 27, 1889.

Application filed January 24, 1889. Serial No. 297,358. (No model.)

*To all whom it may concern:*

Be it known that I, JOHN JOHNSON, a citizen of the United States, residing at Brooklyn, in the county of Kings and State of New York, have invented certain new and useful Improvements in Racking-Off Apparatus for Beer, &c.; and I do hereby declare the following to be a full, clear, and exact description of the invention, such as will enable others skilled in the art to which it appertains to make and use the same.

My invention relates to racking off and filtering beer and other liquids charged with gas, compressed air or gas being used for forcing the beer or other liquid from the storage-cask through the filter into the kegs or other receptacles for sale, and has for its object improved means of getting rid of the gas or air that separates from the beer in the racking-off process, also any air that may be contained in the filter-press at the beginning of the operation and be displaced by the beer, all as hereinafter fully described, reference being made to the accompanying drawings, in which—

Figure 1:
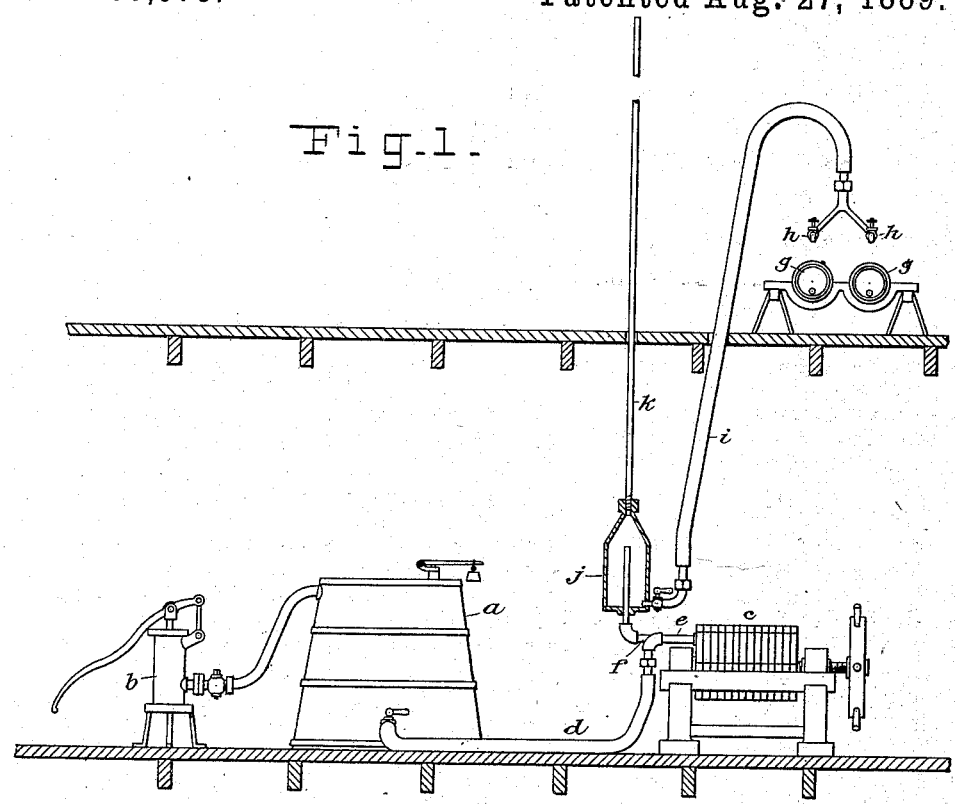
Figure 2:
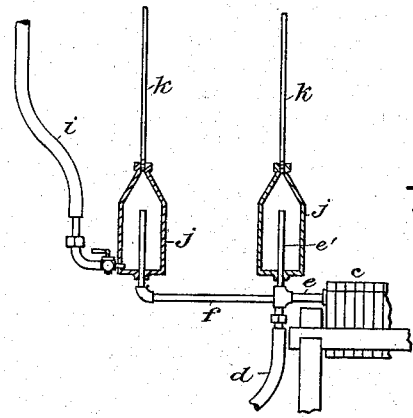

Figure 1 represents racking-off apparatus in side elevation with a part illustrating my invention in section, and Fig. 2 is a detail representing a modification of the same.

The storage-cask containing the beer to be racked off and filtered is represented at $a$, with the usual force-pump $b$, to expel the beer therefrom by compressed air or other vapor or gas. $c$ is the filter-press, connected with said cask by any suitable pipe $d$; $e$, the inlet and $f$ the outlet pipes of the filter; $g$, the shipping or other kegs to receive the beer; $h$, the filtering-nozzles, and $i$ the pipe through which the beer reaches said nozzles from the filter-press, all being substantially as in the common arrangement of such apparatus.

Some of the gas with which the beer is charged in the storage-tank separates from the beer while going through the filtering process, and there is generally some air in the filter-press to begin with, both of which it is desirable to eliminate from the beer, so that what beer enters the kegs shall as far as possible only contain the gas duly incorporated with it. This has been done by collecting them in a receiver located at the top of the press and having a cock or valve to be opened from time to time and allow them to be forced out of the top of the receiver by the beer, which displaces the air and gas and fills the receiver until it is displaced in turn by successive accumulation, when the waste-cock is again opened and the collection again discharged, the gas and air being subject to pressure at the point of escape and causing some disturbance of the beer, which induces the further separation of more gas than would otherwise collect in the receiver. To avoid this undue waste of the gas and also to avoid the care and attention in the management of the apparatus, I provide for the continuous and automatic escape of these waste vapors by a hydrostatic vent, consisting of the receptacle $j$, into the upper part of which the beer is received directly from the filter-press through pipe $f$, and out of which it flows at or near the bottom into the pipe $i$, leading to the keg-filtering nozzles, and said receptacle having a stand-pipe $k$, open to the atmosphere at the top, and containing a column of beer, the pressure of which balances the pressure on the beer issuing from the filter-press, said pipe being extended a suitable distance above the height of the beer column to prevent overflow by the fluctuations of the same due to variations of the pressure.

It will be seen that the air and separated gas entering receptacle $j$ above the outflow-passage for the beer will at once rise through the heavier liquid to the surface of the column of beer in the stand-pipe, and there pass off at atmospheric pressure without any disturbance tending to cause further separation of gas, the escape being continuous without care or attention, and the pressure being at the same time maintained on the beer as well or better than before.

It will in some cases be desirable to employ another vent of the same kind on the inlet to the filter-press; also, to allow of the escape of whatever separated gas and air that may be in the pipe $d$, and thus avoid the entry of such vapors into the filter-press, and I will in such cases so apply another thereto, as represented in Fig. 2, or in any other approved way. In this case it is a branch $e'$ of the inlet-pipe which enters the vessel $j$, while it is the end of the outlet-pipe $f$ that enters the other vessel $j$; but in these respects the details may be varied at will.

What I claim, and desire to secure by Letters Patent, is—

In a racking-off apparatus for beer and other liquids, the combination of the hydrostatic vent for the elimination of the air and separated gas and discharge of the same at atmospheric pressure with the filter-press and the keg-filling pipe, said vent consisting of the receptacle $j$ and stand-pipe $k$, open to the atmosphere through the upper end of the pipe, and connected in the apparatus so as to receive the beer on its way to the filling-nozzles above the outlet-connection of the filling-pipe, substantially as described.

In testimony whereof I affix my signature in presence of two witnesses.

JOHN JOHNSON.

Witnesses:
W. J. MORGAN,
W. B. EARLL.